(12) United States Patent
Kim et al.

(10) Patent No.: US 12,510,916 B2
(45) Date of Patent: Dec. 30, 2025

(54) ELECTRONIC PEDAL DEVICE

(71) Applicants: Hyundai Motor Company, Seoul (KR); Kia Corporation, Seoul (KR)

(72) Inventors: Eun Sik Kim, Gwangmyeong (KR); Hyeon Uk Kim, Daegu (KR); Kyung Nam Kim, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 8 days.

(21) Appl. No.: 18/651,356

(22) Filed: Apr. 30, 2024

(65) Prior Publication Data

US 2025/0190007 A1  Jun. 12, 2025

(30) Foreign Application Priority Data

Dec. 12, 2023  (KR) .................. 10-2023-0179783

(51) Int. Cl.
*G05G 5/03*  (2008.04)
*B60K 26/02*  (2006.01)
*B60T 7/08*  (2006.01)
*G05G 1/38*  (2008.04)
*G05G 5/05*  (2006.01)

(52) U.S. Cl.
CPC ............. *G05G 5/03* (2013.01); *B60K 26/021* (2013.01); *B60T 7/085* (2013.01); *G05G 1/38* (2013.01); *G05G 5/05* (2013.01); *G05G 2505/00* (2013.01)

(58) Field of Classification Search
None
See application file for complete search history.

(56) References Cited

U.S. PATENT DOCUMENTS

| 11,560,127 | B2 * | 1/2023 | Galea | B60T 8/409 |
| 11,787,373 | B2 * | 10/2023 | O'Neill | G05G 5/03 |
| | | | | 74/512 |
| 2005/0082909 | A1 * | 4/2005 | Constantakis | B60T 8/3255 |
| | | | | 303/20 |
| 2015/0101447 | A1 * | 4/2015 | Kim | B60T 8/409 |
| | | | | 74/512 |

FOREIGN PATENT DOCUMENTS

CN  103818361 A * 5/2014 ............. B60T 8/409

* cited by examiner

*Primary Examiner* — Vicky A Johnson
(74) *Attorney, Agent, or Firm* — MORGAN, LEWIS & BOCKIUS LLP

(57) ABSTRACT

An electronic pedal device at operates in a pressure operation manner and thus enables a driver to operate a pedal with a small force. It is possible to greatly change operation force of a pedal pad using an elastic material which is formed to be gradually increased in a spring constant although the operational displacement of the pedal is very small, enabling the driver to easily recognize the operation state of the pedal pad. The pedal device detects operation of the pedal through a dual detecting structure using a first pressure sensor and a second pressure sensor, further ensuring safety in response that operating the pedal.

20 Claims, 10 Drawing Sheets

FIG. 5
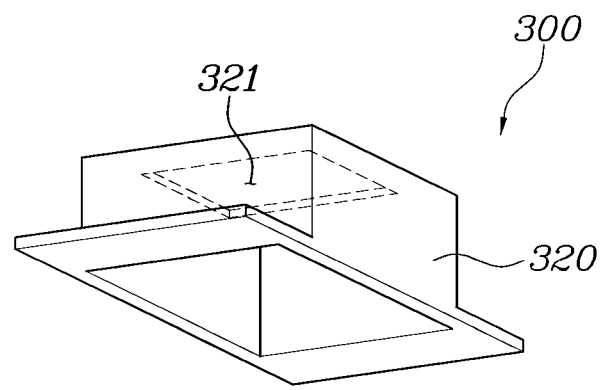
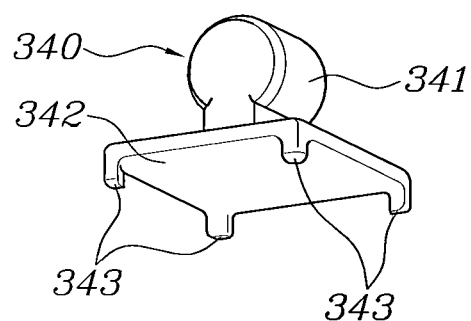
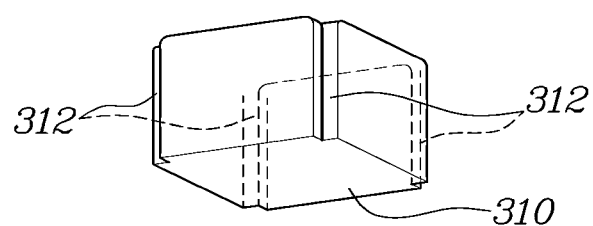
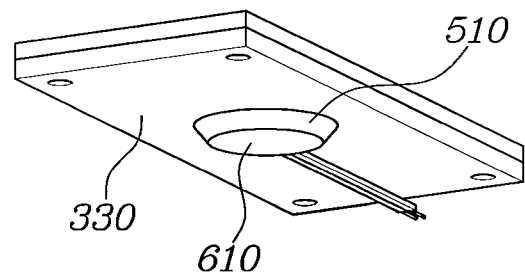

ELECTRONIC PEDAL DEVICE

CROSS-REFERENCE TO THE RELATED APPLICATION

The present application claims priority to Korean Patent Application No. 10-2023-0179783, filed on Dec. 12, 2023, the entire contents of which is incorporated herein for all purposes by this reference.

BACKGROUND OF THE PRESENT DISCLOSURE

Field of the Present Disclosure

The present disclosure relates to an electronic pedal device mounted in a vehicle to generate an acceleration signal or a braking signal in response to operation by a driver.

Description of Related Art

An autonomous vehicle is a smart vehicle employing autonomous driving technology by which the vehicle is capable of autonomously travelling to a set destination by itself without manipulation of the steering wheel, the accelerator, the brake, or the like by a driver.

In a case in which an autonomous driving situation is universally implemented, a driver may select an autonomous driving mode, in which the vehicle autonomously travels to a destination without a driving operation on the part of the driver.

In the autonomous driving mode, a driver may desire to rest comfortably while stretching out his or her legs. In the instant case, if pedals (an accelerator pedal and a brake pedal) located in the space below the driver's seat remain exposed to the passenger compartment space of the vehicle, they may disturb the driver's relaxation. In addition, there is a risk of the occurrence of an accident caused by undesired operation of the pedals.

To solve the present problem, a foldable pedal device has been developed. In the manual driving mode in which the driver manually drives a vehicle, the foldable pedal device exposes a pedal pad to the driver so that the driver can operate the pedal pad, and in the autonomous driving mode, the foldable pedal device blocks exposure of the pedal pad so that the pedal pad is not operated by the driver, ensuring comfortable relaxation for the driver and preventing undesirable operation of the pedal pad, thus ensuring safety.

However, the foldable pedal device has disadvantages in that a space for hiding the pedal device in a hidden state is necessary and the operation mechanism thereof is complicated.

As an alternative thereto, a pressure-operation-type pedal device has been developed.

The pressure-operation-type pedal device has advantages in that the operational displacement of the pedal is very small, the operation mechanism thereof is simple, and a mechanical configuration related to folding/unfolding operation is not necessary. Therefore, the pressure-operation-type pedal device may greatly increase the efficiency of use of the indoor space of an autonomous vehicle.

However, because the operational displacement of the pedal is very small, the pressure-operation-type pedal device makes it difficult for the driver to recognize how much he/she operates the pedal. Therefore, there is a demand for technology for solving the above problems.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic pedal device mounted in a vehicle to generate an acceleration signal or a braking signal in response to operation by a driver and enabling a driver to operate a pedal with a small force and to easily recognize the operational state of the pedal using an elastic material which is formed to be gradually increased in a spring constant although the operational displacement of the pedal is very small, reducing driver fatigue.

Furthermore, it is another object of the present disclosure to provide an electronic pedal device configured for detecting operation of a pedal through a dual detecting structure using two pressure sensors, further ensuring safety in response that operating the pedal.

In accordance with the present disclosure, the above and other objects may be accomplished by the provision of an electronic pedal device including a pedal pivotably coupled to a pedal housing and a connection unit connecting the pedal to the pedal housing and including an elastic material formed to be gradually increased in a spring constant while being compressed in response that the pedal is pivoted to be inserted into the pedal housing.

The pedal may include a pedal pad pivotably coupled at a lower end portion thereof to the pedal housing via a hinge pin and a return spring configured to support the pedal pad and to apply return force to the pedal pad.

The connection unit including the elastic material may be disposed farther away from the hinge pin than the return spring.

The elastic material may include a plurality of individual elastic materials including different spring constants and stacked in multiple layers, and the plurality of individual elastic materials may be formed of memory foam or rubber.

The plurality of individual elastic materials stacked in the multiple layers may include an integrated structure in which adjacent elastic materials thereof are coupled to each other.

The elastic material may include a plurality of individual elastic materials including different spring constants and stacked in multiple layers, the plurality of individual elastic materials may have the same cross-sectional thickness, and the spring constants of the plurality of individual elastic materials may gradually increase from the uppermost individual elastic material to the lowermost individual elastic material.

The elastic material may include a plurality of individual elastic materials including different cross-sectional thicknesses and different spring constants and stacked in multiple layers, the cross-sectional thicknesses of the plurality of individual elastic materials may gradually increase from the uppermost individual elastic material to the lowermost individual elastic material, and the spring constants of the plurality of individual elastic materials may gradually increase from the uppermost individual elastic material to the lowermost individual elastic material.

The connection unit may further include a connection case mounted in the pedal housing to be regulated in position and accommodating the elastic material to guide linear movement of the elastic material, a fixing plate coupled to the lower end portion of the connection case to support a lower surface of the elastic material, and a push rod extending through the connection case and including a first end portion pivotably connected to the pedal pad and a second end portion supporting an upper surface of the elastic material in the connection case.

The push rod may include a circular top protruding portion rotatably coupled in an arc recess formed in a seating portion of the pedal pad outside the connection case and a planar bottom surface portion supporting the upper surface of the elastic material in the connection case.

The circular top protruding portion may be formed to be smaller than the planar bottom surface portion while coaxially aligning the center of gravity of the circular top protruding portion and the center of gravity of the planar bottom surface portion with each other.

The elastic material may include a plurality of individual elastic materials having different spring constants and stacked in multiple layers, and the planar bottom surface portion of the push rod may be in surface-contact with an individual elastic material having the smallest spring constant.

The push rod may include a plurality of fixing protrusions, the elastic material may include a plurality of protrusion grooves formed therein to allow the fixing protrusions to be fitted into the plurality of protrusion grooves, and in response that the elastic material is compressed or restored, the fixing protrusions may move along the protrusion grooves.

The electronic pedal device may further include a first material and a second material mounted in the pedal pad and the push rod, respectively, and positioned to face each other in an area in which the pedal pad and the push rod are connected to each other. The first material and the second material may be configured to generate magnetic attraction therebetween to provide a feeling of operation of the pedal pad for a driver.

Both the first material and the second material may be implemented as magnets. Alternatively, one of the first material and the second material may be a magnet, and the other thereof may be a metal attracted to the magnet.

The electronic pedal device may further include a first pressure sensor fixedly mounted in the pedal housing to be connected to the connection unit via a first damper and configured to detect pressure in response that the elastic material is compressed by pivotal movement of the pedal pad by a driver and a printed circuit board (PCB) mounted in the pedal housing and operatively connected to the first pressure sensor and configured to receive a signal from the first pressure sensor and to generate a signal related to a pedal function of a vehicle.

The electronic pedal may further include a second pressure sensor fixedly mounted in the pedal housing to be connected to a lower end portion of the return spring via a second damper and configured to detect pressure in response that the return spring is compressed by pivotal movement of the pedal pad by the driver. The PCB may receive a signal from the second pressure sensor and may be configured to generate a signal related to the pedal function of the vehicle.

The PCB may compare a first sensor value received from the first pressure sensor and a second sensor value received from the second pressure sensor. In response that the first and second sensor values are identical to each other or a difference between the first and second sensor values is within a predetermined range, the PCB may be configured to determine that the pedal function of the vehicle is normal. In response that the difference between the first and second sensor values is outside the predetermined range, the PCB may be configured to conclude that the pedal function of the vehicle is abnormal. Upon determining that the pedal function of the vehicle is normal, the PCB may be configured to generate a signal related to the pedal function of the vehicle. Upon determining that the pedal function of the vehicle is abnormal, the PCB may be configured to generate an error signal.

The electronic pedal device may further include a cover covering an upper side of the pedal housing. A pedal stopper may be coupled to the pedal pad, and in response that the pedal stopper comes into contact with the cover, the initial position of the pedal pad and the return position of the pedal pad by the spring force of the return spring may be regulated.

In response that the pedal pad is operated and comes into contact with the connection unit, the full-stroke position of the pedal pad may be regulated.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 is an exploded view of a connection unit according to an exemplary embodiment of the present disclosure;

Figure 1:
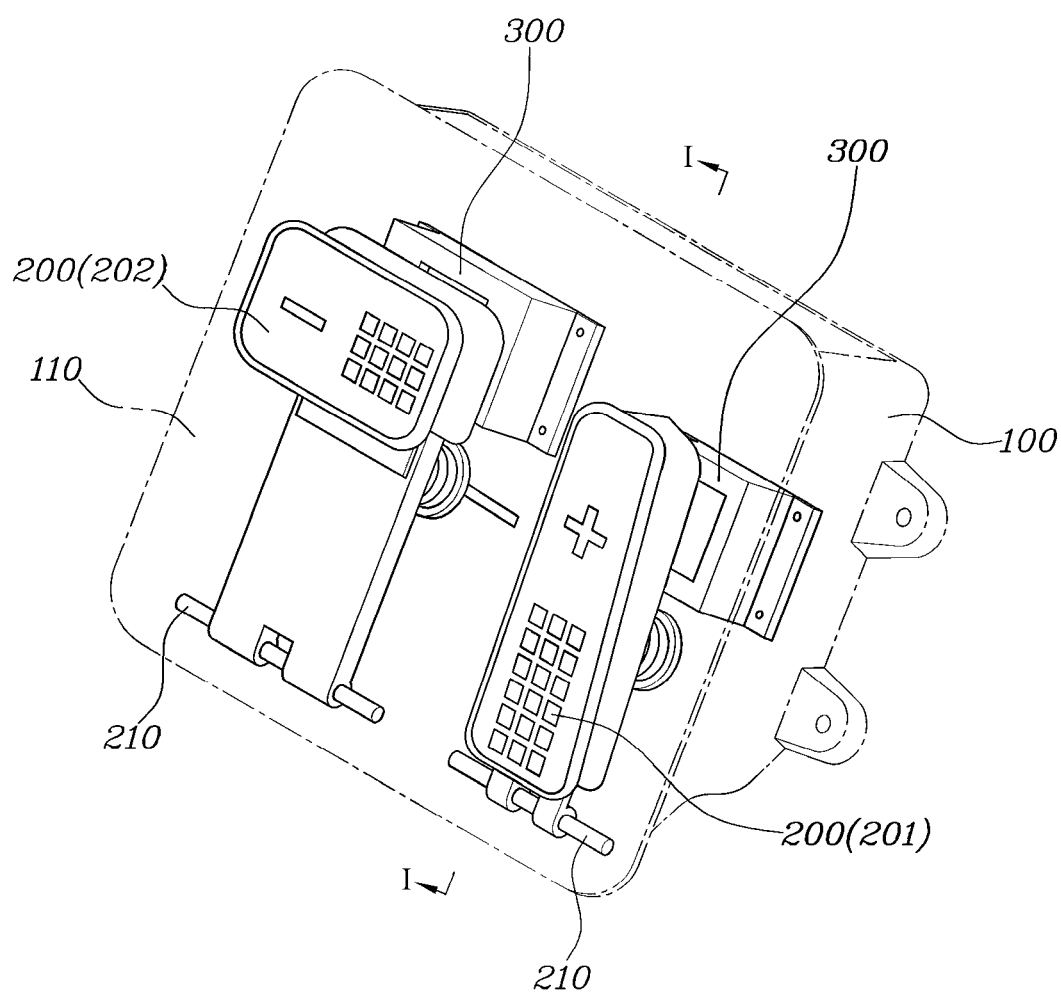
FIG. 1 is a perspective view of an electronic pedal device according to an exemplary embodiment of the present disclosure.
Figure 2:
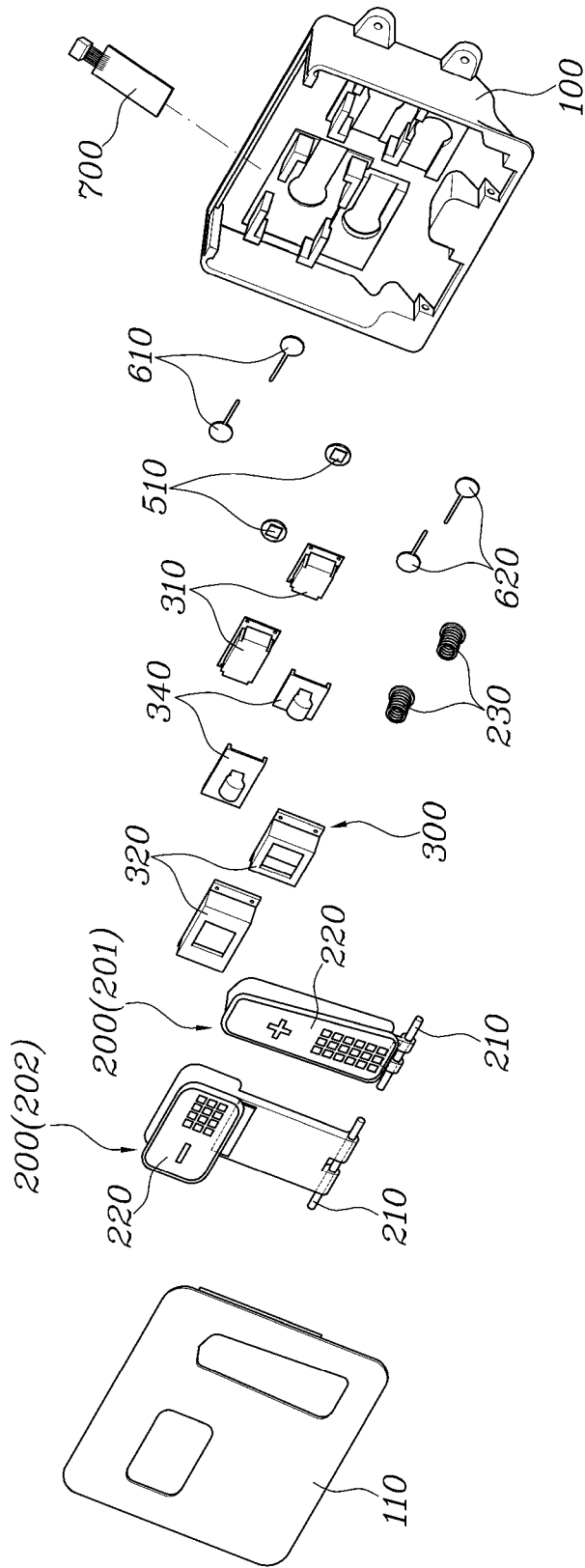
FIG. 2 is an exploded view of FIG. 1.
Figure 3:
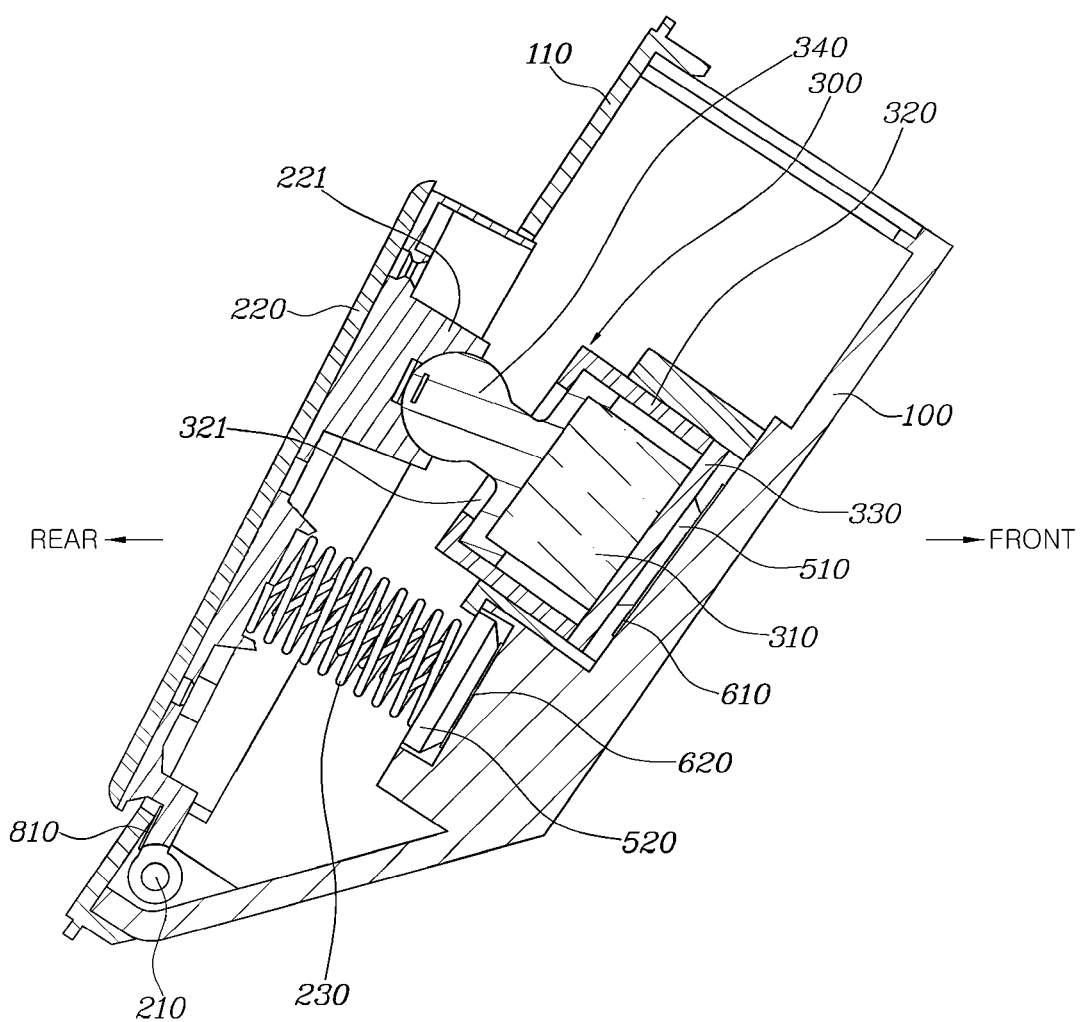
FIG. 3 is a cross-sectional view taken along line I-I in FIG. 1, which shows an initial-position state of a pedal pad.
Figure 4:
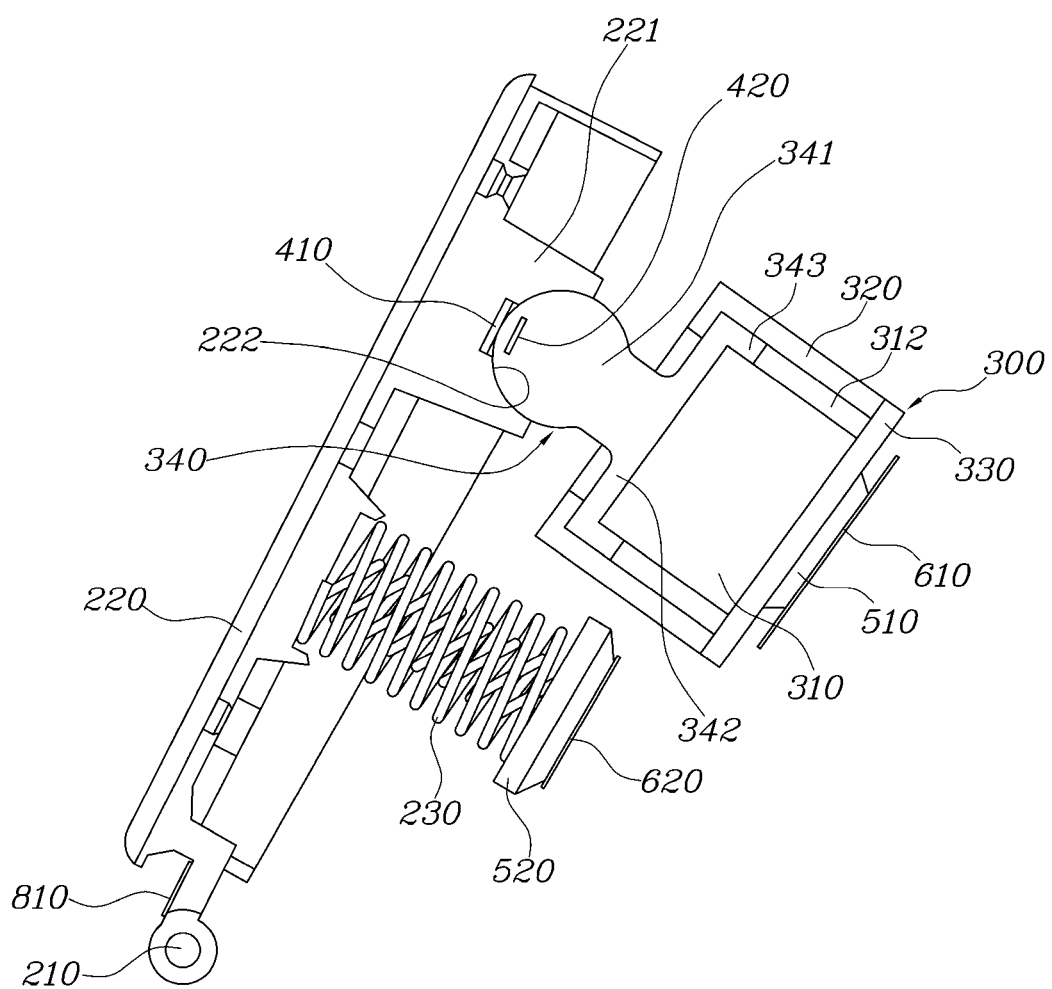
FIG. 4 is a view of the electronic pedal device shown in FIG. 3, with a pedal housing and a cover removed therefrom.
Figure 6:
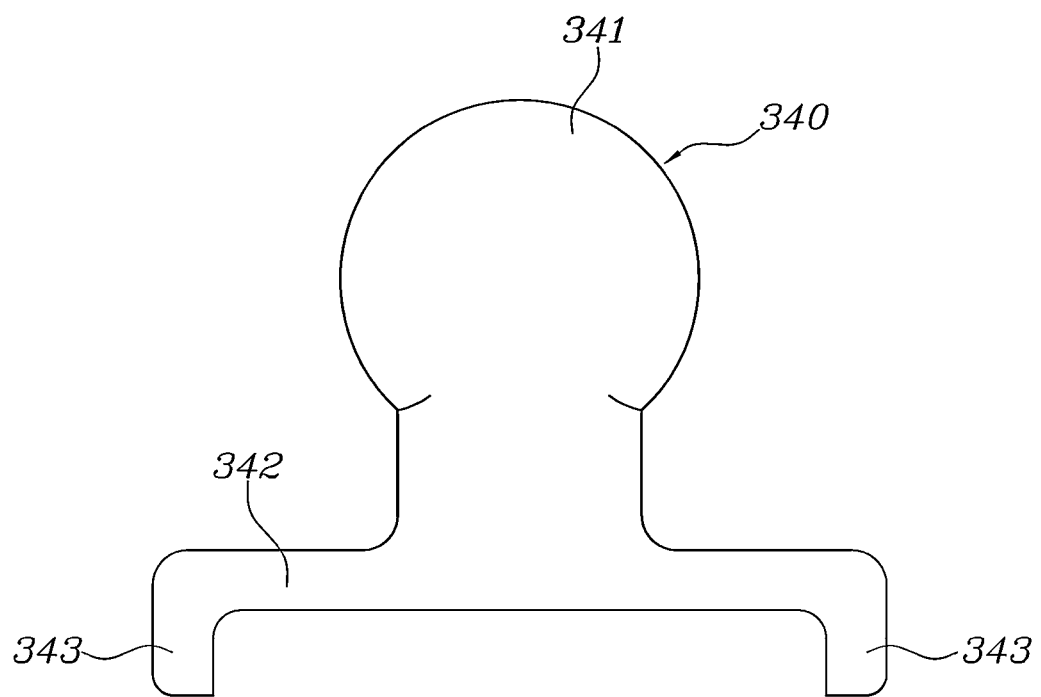
FIG. 6, FIG. 7, FIG. 8, and FIG. 9 are views for explaining a push rod and an elastic material according to an exemplary embodiment of the present disclosure.
Figure 7:
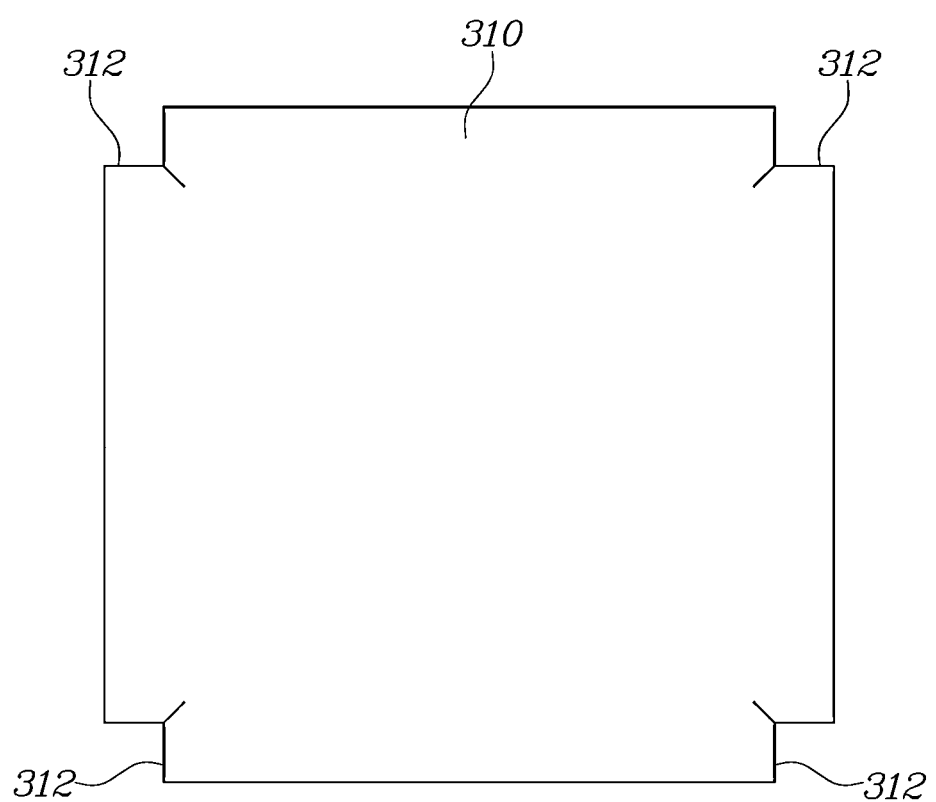

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the exemplary embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In the following description of the exemplary embodiments disclosed in the present specification, a detailed description of known functions and configurations incorporated herein will be omitted when the same may make the subject matter of the exemplary embodiments disclosed in the present specification rather unclear.

Furthermore, the accompanying drawings are provided only for a better understanding of the exemplary embodiments disclosed in the present specification and are not intended to limit the technical ideas disclosed in the present specification. Therefore, it should be understood that the accompanying drawings include all modifications, equivalents, and substitutions within the scope and spirit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present.

On the other hand, when a component is referred to as being "directly connected to" or "directly coupled to" another component, there are no intervening components present.

As used herein, the singular form is intended to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Furthermore, the terms "unit" and "control unit" forming part of the names of the motor control unit (MCU) and the hybrid control unit (HCU) are merely terms that are widely used in the naming of a controller configured for controlling a predetermined function of a vehicle, and should not be construed as meaning a generic function unit.

To control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto.

Hereinafter, an electronic pedal device according to an exemplary embodiment of the present disclosure will be described with reference to the accompanying drawings.

An electronic pedal device according to an exemplary embodiment of the present disclosure is of an organ type, and includes a fine displacement pedal configured to operate by fine displacement when operated by a driver. As shown in FIGS. 1 to 10, the electronic pedal device according to an exemplary embodiment of the present disclosure includes a pedal 200 pivotably coupled to a pedal housing 100 and a connection unit 300 connecting the pedal 200 to the pedal housing 100 and including an elastic material 310 formed to be gradually increased in a spring constant (k) while being compressed when the pedal 200 is pivoted to be inserted into the pedal housing 100.

The pedal housing 100 is fixedly mounted in the space below the driver's seat, and is formed in a shape of a box including an empty interior.

The pedal housing 100 includes a cover 110, and the upper portion of the pedal housing 100 is covered by the cover 110.

The pedal 200 is mounted to protrude above the cover 110 so that the driver operates the pedal 200.

The pedal 200 according to an exemplary embodiment of the present disclosure includes an accelerator pedal 201 and a brake pedal 202, which are mounted in the pedal housing 100 to be spaced from each other in a leftward-rightward direction thereof.

To prevent erroneous operation by the driver, the accelerator pedal 201 may be mounted to be elongated vertically, and the brake pedal 202 may be mounted to be elongated horizontally. However, the present disclosure is not limited thereto.

The accelerator pedal 201 and the brake pedal 202 forming the pedal 200 have high commonality because the configurations and operations of components thereof are extremely similar to each other.

Therefore, the accelerator pedal 201 and the brake pedal 202 will be collectively referred to as the pedal 200, and the configuration of the pedal 200 will be described below without individually describing the configuration of the accelerator pedal 201 and the configuration of the brake pedal 202.

The pedal 200 according to an exemplary embodiment of the present disclosure includes a pedal pad 220 pivotably coupled at the lower end portion thereof to the pedal housing 100 via a hinge pin 210 and a return spring 230 supporting the pedal pad 220 to apply return force thereto.

The pedal pad 220 may be of an organ type, the upper end portion of which pivots forwards and backwards about the hinge pin 210 coupled to the lower end portion thereof.

The return spring 230 is mounted so that the lower end portion thereof is supported by the pedal housing 100 and the upper end portion thereof supports the lower surface of the pedal pad 220. The return spring 230 may include a plurality of springs having different spring forces to implement fail-safe and to generate a pedal effort efficiently.

When the pedal pad 220 is pivoted forward by operation force applied thereto by the driver, the return spring 230 is compressed. When the operation force applied to the pedal pad 220 by the driver is released in the pivoted state of the pedal pad 220, the return spring 230 is restored to the original shape thereof. In the instant case, the pedal pad 220 is pivoted backward by the spring force of the return spring 230, and returns to the initial position thereof.

The pedal device according to an exemplary embodiment of the present disclosure includes a structure in which the connection unit 300 including the elastic material 310 is disposed farther away from the hinge pin 210 than the return spring 230.

In an exemplary embodiment of the present disclosure, the return spring 230 may be disposed closer to the hinge pin 210 than the connection unit 300 including the elastic material 310, and the connection unit 300 including the elastic material 310 may be disposed farther away from the hinge pin 210 than the return spring 230.

When the pedal pad 220 rotates at a predetermined angle about the hinge pin 210, the linear displacement of a portion located relatively away from the hinge pin 210 is greater than the linear displacement of a portion located relatively close to the hinge pin 210. Therefore, the connection unit 300 including the elastic material 310 having a large change in pedal effort is disposed farther away from the hinge pin 210 than the return spring 230, whereby a pedal effort may be greatly changed.

Since the pedal pad 220 is structured to rotate about the hinge pin 210, the elastic material 310 having a large change in pedal effort is disposed at a portion located relatively far away from the hinge pin 210 and having a relatively large linear displacement, achieving a very large change in pedal effort when the pedal is operated.

A first pressure sensor 610, which will be described later, may be placed on the elastic material 310 having a relatively large change in pedal effort when the pedal is operated, and a signal from the first pressure sensor 610 may be used as a main signal.

Since the return spring 230 is disposed closer to the hinge pin 210 than the connection unit 300 including the elastic material 310, a change in the pedal effort may be smaller than that of the elastic material 310. Accordingly, the layout of the pedal device may be smaller than that of a portion on which the connection unit 300 is disposed.

A second pressure sensor 620, which will be described later, may be placed on the return spring 230 having a relatively small change in pedal effort when the pedal is operated, and a signal from the second pressure sensor 620 may be used as a redundancy signal.

The elastic material 310 according to an exemplary embodiment of the present disclosure may include a plurality of individual elastic materials 311 having different spring constants and stacked in multiple layers. The plurality of individual elastic materials 311 may be formed of memory foam or rubber.

The individual elastic material 311 is a material having a small cross-sectional thickness t1 and a non-linear spring constant. The elastic material 310 configured so that the plurality of individual elastic materials 311 are stacked in multiple layers has advantages in that the quality thereof is easy to control, implementation of a large hysteresis is possible, and implementation of a pedal effort curve of a quadratic function is possible.

Because the elastic material 310, in which the plurality of individual elastic materials 311 having a small cross-sectional thickness is stacked, is formed of a material having a very large hysteresis, a large hysteresis may be implemented, and accordingly, driver ankle fatigue may be reduced.

The plurality of individual elastic materials 311 stacked in multiple layers include an integrated structure in which adjacent elastic materials thereof are coupled to each other.

The elastic material 310 according to an exemplary embodiment of the present disclosure includes a structure in which the plurality of individual elastic materials 311, each having a small cross-sectional thickness, are coupled to each other and stacked in multiple layers.

In the state in which the plurality of individual elastic materials 311 are stacked in multiple layers, adjacent elastic materials thereof may be coupled to each other using various methods, such as thermal fusion, bonding, or double-sided tape.

When the plurality of individual elastic materials 311 is coupled to each other to be integrated in the stacked state, there is no concern of a swelling phenomenon occurring in the elastic material 310 during assembly or use thereof. That is, the plurality of individual elastic materials 311 are prevented from individually protruding or deviating to the side during assembly or use thereof, whereby a pedal effort curve of a quadratic function may be implemented, and the durability and quality thereof may be ensured.

The elastic material 310 according to an exemplary embodiment of the present disclosure, in which the plurality of individual elastic materials 311 is stacked in multiple layers, is characterized in that the cross-sectional thicknesses t1 of the plurality of individual elastic materials 311 are identical to each other, and the spring constants thereof gradually increase from the uppermost individual elastic material 311 to the lowermost individual elastic material 311.

Figure 8:
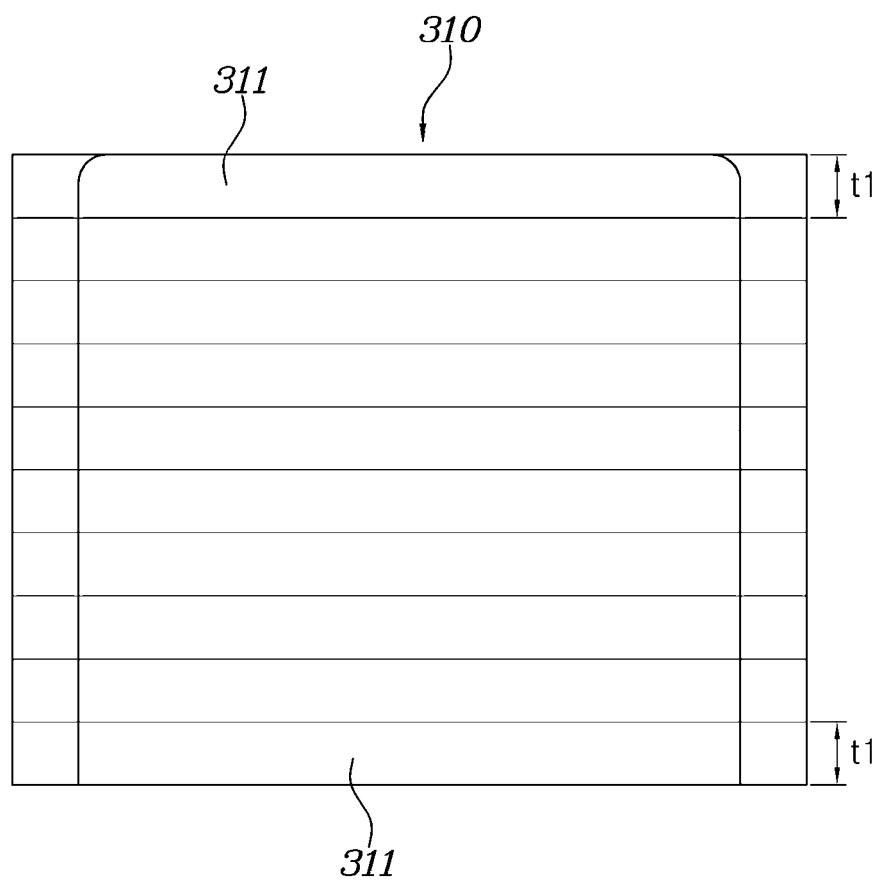

Referring to FIG. 8, the plurality of individual elastic materials 311 is stacked in multiple layers to form a single integrated elastic material 310.

Among the stacked individual elastic materials 311, the cross-sectional thicknesses t1 thereof may be identical to each other, and the spring constants thereof may gradually increase from the uppermost individual elastic material 311 to the lowermost individual elastic material 311.

That is, the integrated elastic material 310 formed by stacking the plurality of individual elastic materials 311 in multiple layers may be configured so that the spring constant thereof gradually increases from above to below.

To the present end, an individual elastic material 311 having the smallest spring constant is disposed on the uppermost layer of the elastic material 310, other individual elastic materials 311 are sequentially disposed thereunder in ascending order of spring constant, and an individual elastic material 311 having the largest spring constant is disposed on the lowermost layer of the elastic material 310.

Therefore, when the pedal 200 is operated, the compressed amount of the uppermost individual elastic material 311 having the smallest spring constant is the largest, the compressed amounts of the plurality of individual elastic materials 311 disposed thereunder are gradually reduced from above to below, and the compressed amount of the lowermost individual elastic material 311 having the largest spring constant is the smallest. Accordingly, when the pedal is operated, a pedal effort curve of a quadratic function may be implemented due to the elastic material 310, with a result that the driver may feel a large change in pedal effort even when a pedal operation displacement is small.

The elastic material 310 according to another exemplary embodiment of the present disclosure is configured so that a plurality of individual elastic materials 311 is stacked in multiple layers, the cross-sectional thicknesses t1, t2, . . . , and t6 of the stacked individual elastic materials 311 gradually increase from above to below, and the spring constants of the stacked individual elastic materials 311 gradually increase from above to below.

Figure 9:
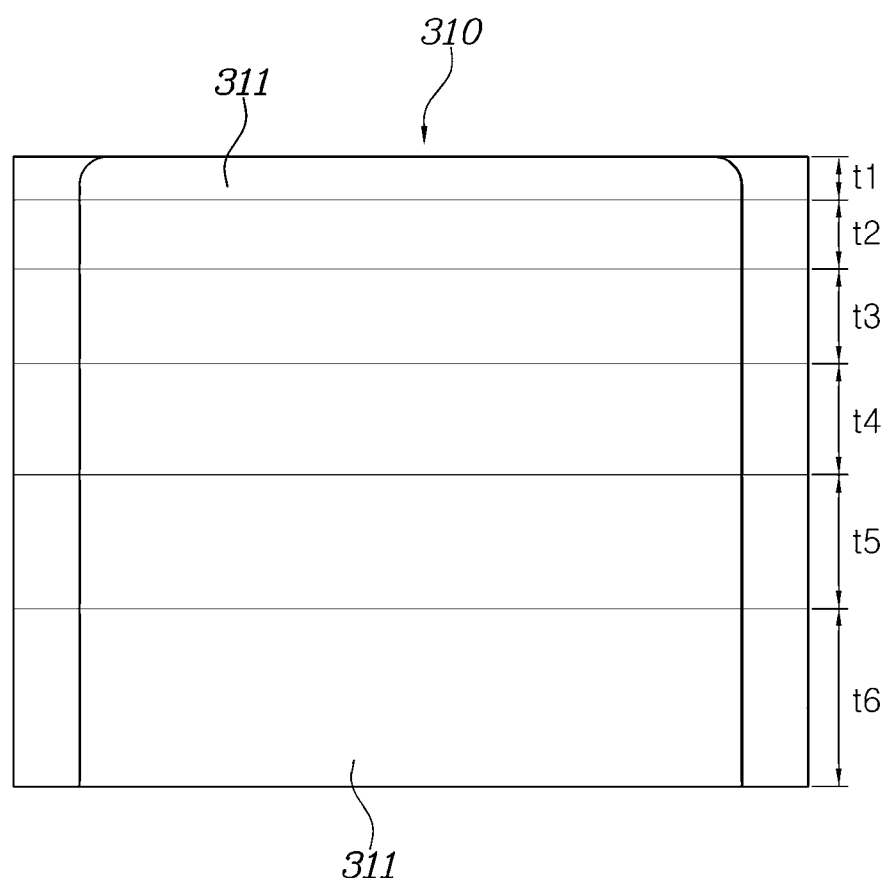
Figure 10:
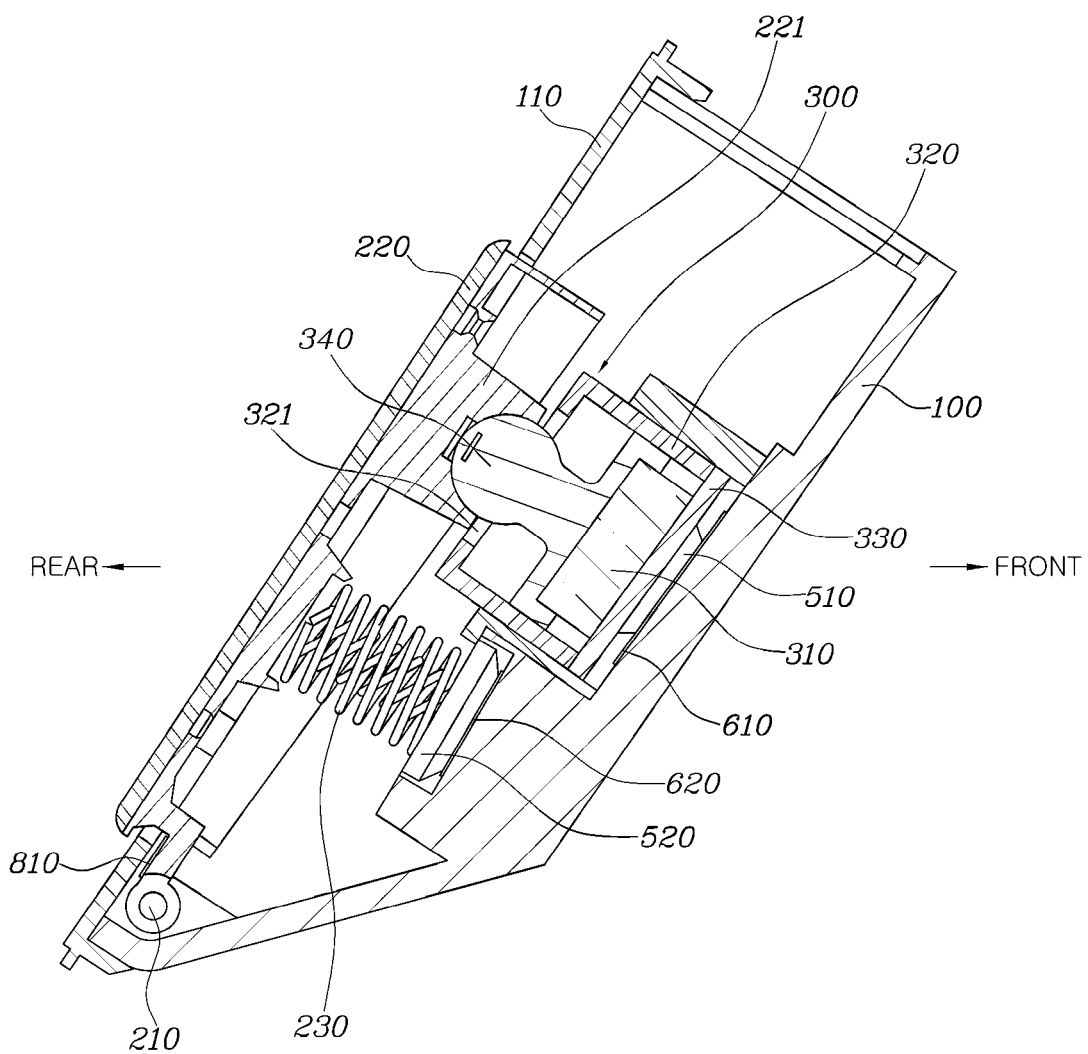
FIG. 10 is a view showing a full-stroke state of the pedal pad.

Referring to FIG. 9, the plurality of individual elastic materials 311 is stacked in multiple layers to form a single integrated elastic material 310.

Here, the cross-sectional thicknesses of the plurality of individual elastic materials 311 may be set to be different from each other.

In more detail, in the structure in which the plurality of individual elastic materials 311 are stacked in multiple layers, the cross-sectional thicknesses t1, t2, t3, t4, t5 and t6 of the plurality of individual elastic materials 311 gradually increase from above to below. Accordingly, the elastic material 310 formed by stacking the plurality of individual elastic materials 311 in multiple layers may be configured so that the spring constant thereof gradually increases from above to below.

Because the spring constant of the elastic material 310 changes non-linearly, it is possible to realize an effect that the spring constant changes as the cross-sectional thicknesses gradually change from above to below.

The connection unit 300 according to an exemplary embodiment of the present disclosure may further include a connection case 320 mounted in the pedal housing 100 to be regulated in position and accommodating the elastic material 310 to guide linear movement of the elastic material 310, a fixing plate 330 coupled to the lower end portion of the connection case 320 to support the lower surface of the elastic material 310, and a push rod 340 extending through the connection case 320 so that one end portion thereof is pivotably connected to the pedal pad 220 and the other end portion thereof supports the upper surface of the elastic material 310 in the connection case 320.

The connection unit 300 may be constituted by the elastic material 310, the connection case 320, the fixing plate 330, and the push rod 340.

The connection case 320 may be formed in a shape of a hexahedral box that includes an open lower end portion and a hole 321 formed in the upper end portion thereof to allow the push rod 340 to pass therethrough.

The push rod 340 is mounted through the hole 321 in the connection case 320, the lower end portion of the push rod 340 and the elastic material 310 are inserted into the connection case 320 so that the lower end portion of the push rod 340 is in contact with and supports the upper surface of the elastic material 310, and the fixing plate 330, which is formed as a planar plate, is coupled to the open lower end portion of the connection case 320 to shield the open lower end portion of the connection case 320 while supporting the lower surface of the elastic material 310.

The push rod 340 according to an exemplary embodiment of the present disclosure may include a circular top protruding portion 341 rotatably coupled in an arc recess 222 in a seating portion 221 of the pedal pad 220 outside the connection case 320 and a planar bottom surface portion 342 supporting the upper surface of the elastic material 310 in the connection case 320.

Because the circular top protruding portion 341 is connected to the pedal pad 220 and the planar bottom surface portion 342 is in contact with the upper surface of the elastic material 310, the push rod 340 compresses the elastic material 310 while moving along the connection case 320 when the pedal pad 220 pivots due to operation by the driver.

The seating portion 221 protrudes downwardly from the lower surface of the pedal pad 220, and the arc recess 222 is formed in the seating portion 221. The circular top protruding portion 341 of the push rod 340 is rotatably fitted in the arc recess 222.

The arc recess 222 is formed in a semicircular arc shape, and is formed to be open downward toward the push rod 340.

The arc recess 222 in the seating portion 221 may be formed to include the same size as or a slightly larger size than the circular top protruding portion 341 of the push rod 340. Accordingly, when the pedal pad 220 pivots, shaking of the pedal pad 220 in the longitudinal direction (forward-backward direction) may be sufficiently absorbed in the arc recess 222 in the seating portion 221.

The circular top protruding portion 341 of the push rod 340 may be formed to be smaller than the planar bottom surface portion 342 of the push rod 340 while coaxially aligning the center of gravity of the circular top protruding portion 341 and the center of gravity of the planar bottom surface portion 342 with each other. Accordingly, the circular top protruding portion 341 may be located at the center of the planar bottom surface portion 342.

The push rod 340 according to an exemplary embodiment of the present disclosure, in which the circular top protruding portion 341 is formed to be smaller than the planar bottom surface portion 342, is mounted so that the circular top protruding portion 341 having a relatively small size is connected to the pedal pad 220 and the planar bottom surface portion 342 having a relatively large size is in contact with the upper surface of the elastic material 310.

Since the planar bottom surface portion 342, which is greater than the circular top protruding portion 341, presses the elastic material 310, a large elastic material 310 including a size corresponding to the size of the planar bottom surface portion 342 may be used. Accordingly, it is possible to implement a large change in pedal effort when the pedal is operated.

The elastic material 310 according to an exemplary embodiment of the present disclosure may be formed by stacking a plurality of individual elastic materials 311 having different spring constants in multiple layers, and the planar bottom surface portion 342 of the push rod 340 may be in surface-contact with the individual elastic material 311 having the smallest spring constant.

The elastic material 310 is configured so that a plurality of individual elastic materials 311 is stacked in multiple layers, and the spring constants of the stacked individual elastic materials 311 gradually increase from above to below.

Among the stacked individual elastic materials 311 of the elastic material 310, the individual elastic material 311 having the smallest spring constant is disposed on the uppermost layer and is in surface-contact with the planar bottom surface portion 342 of the push rod 340, and the individual elastic material 311 having the largest spring constant is disposed on the lowermost layer and is in surface-contact with the fixing plate 330.

According to an exemplary embodiment of the present disclosure, the push rod 340 includes a plurality of fixing protrusions 343, and the elastic material 310 includes a plurality of protrusion grooves 312 formed therein to allow the fixing protrusions 343 to be fitted thereinto. When the elastic material 310 is compressed or restored, the fixing protrusions 343 move along the protrusion grooves 312.

The planar bottom surface portion 342 of the push rod 340 may be formed as a rectangular planar surface, and the fixing protrusions 343 may be bent and extend from the corners of the planar bottom surface portion 342.

The elastic material 310, in which the plurality of individual elastic materials 311 is stacked, may be formed in a rectangular parallelepiped shape, and the protrusion grooves 312 may be formed in the edge portions of the rectangular parallelepiped to extend in the height direction thereof.

The number of fixing protrusions 343 and the number of fixing grooves 312 are identical to each other, and each of the fixing protrusions 343 is fitted into a respective one of the protrusion grooves 312.

When the elastic material 310 is compressed or restored by operation of the pedal, the fixing protrusions 343 move along the protrusion grooves 312. Accordingly, the fixing protrusions 343 may prevent or minimize deformation or shaking of the elastic material 310, making it possible to implement a pedal effort curve of a quadratic function using the elastic material 310.

The pedal device according to an exemplary embodiment of the present disclosure may further include a first material 410 and a second material 420 mounted to face each other in an area in which the pedal pad 220 and the push rod 340 are connected to each other. The first material 410 and the second material 420 may be configured to generate magnetic attraction therebetween to provide a feeling of operation of the pedal pad 220.

The first material 410 and the second material 420 may be mounted in the seating portion 221 of the pedal pad 220 and the circular top protruding portion 341 of the push rod 340, respectively to face each other.

Both the first material 410 and the second material 420 may be implemented as magnets to generate magnetic attraction therebetween. Alternatively, one of the first material 410 and the second material 420 may be a magnet, and the other thereof may be a metal attracted to the magnet.

When both the first material 410 and the second material 420 are implemented as magnets, an N-pole magnet and an S-pole magnet may be disposed to face each other. When one of the first material 410 and the second material 420 is a magnet and the other thereof is a metal, the metal may be steel.

In an exemplary embodiment of the present invention, the magnet may be a permanent magnet but it is not limited.

In an exemplary embodiment of the present disclosure, at the beginning of operation of the accelerator pedal 201, a very small gap may be present between the pedal pad 220 and the push rod 340.

Therefore, if the first material 410 and the second material 420, which generate attraction therebetween, are mounted in the seating portion 221 of the pedal pad 220 and the circular top protruding portion 341 of the push rod 340, there is no gap between the pedal pad 220 and the push rod 340 during operation of the pedal. Furthermore, when the pedal pad 220 comes into contact with the circular top protruding portion 341 of the push rod 340, the driver feels attraction. That is, the driver includes a different feeling from what he/she has when operating the brake pedal 202. Accordingly, erroneous operation of the pedal by the driver may be prevented.

When operating the accelerator pedal, the driver feels magnetic attraction before a sensor signal is output (before the pedal pad comes into contact with the circular top protruding portion of the push rod), and thus easily recognizes that he/she is stepping on the accelerator pedal 201 rather than the brake pedal 202. Accordingly, erroneous operation of the pedal by the driver may be prevented.

The pedal device according to an exemplary embodiment of the present disclosure may further include a first pressure sensor 610 fixedly mounted in the pedal housing 100 to be connected to the connection unit 300 via a first damper 510 and configured to detect pressure when the elastic material 310 is compressed by pivotal movement of the pedal pad 220 by the driver and a printed circuit board (PCB) 700 mounted in the pedal housing 100 and configured to receive a signal from the first pressure sensor 610 and to generate a signal related to the pedal function of the vehicle.

The first damper 510 made of rubber may be mounted on the lower surface of the fixing plate 330 forming the connection unit 300, and the first pressure sensor 610 may be mounted to be in contact with the first damper 510.

When the elastic material 310 is compressed by pivotal movement of the pedal pad 220 by the driver, the first damper 510 receives force from the elastic material 310 and is compressed. Then, the first damper 510 presses the first pressure sensor 610, and the first pressure sensor 610 outputs a value proportional to a load.

The pedal 200 includes the accelerator pedal 201 and the brake pedal 202. When the driver operates the accelerator pedal 201, the PCB 700 generates a signal related to acceleration of the vehicle, and when the driver operates the brake pedal 202, the PCB 700 generates a signal related to braking.

When the driver operates both the accelerator pedal 201 and the brake pedal 202, the PCB 700 generates only a signal related to braking for safety.

The pedal device according to an exemplary embodiment of the present disclosure may further include a second pressure sensor 620 fixedly mounted in the pedal housing 100 to be connected to the lower end portion of the return spring 230 via a second damper 520 and configured to detect pressure when the return spring 230 is compressed by pivotal movement of the pedal pad 220 by the driver. The PCB 700 may also receive a signal from the second pressure sensor 620 and may be configured to generate a signal related to the pedal function of the vehicle.

The second damper 520 made of rubber may be mounted on the lower end portion of the return spring 230, and the second pressure sensor 620 may be mounted to be in contact with the second damper 520.

When the return spring 230 is compressed by pivotal movement of the pedal pad 220 by the driver, the second damper 520 receives force from the return spring 230 and is compressed. Then, the second damper 520 presses the second pressure sensor 620, and the second pressure sensor 620 outputs a value proportional to a load.

When the pedal pad 220 is pivoted by the driver, the first pressure sensor 610 and the second pressure sensor 620 may transmit signals to ensure redundancy.

The elastic material 310, which is configured so that the plurality of individual elastic materials 311 having different spring constants is stacked, has a large change in pedal effort according to operation of the pedal. Accordingly, the first pressure sensor 610 provided at the elastic material 310 may be used as a main sensor detecting the operation amount of the pedal.

When the pedal pad 220 is pivoted by the driver, the return spring 230 has a small change in pedal effort compared to the elastic material 310. Accordingly, the second pressure sensor 620 provided at the return spring 230 may be used as a redundancy sensor detecting the operation amount of the pedal.

In the present way, the exemplary embodiment of the present disclosure is characterized by having a dual detecting structure of detecting pivotal movement of the pedal pad 200 through the first pressure sensor 610 and the second pressure sensor 620. Accordingly, it is possible to implement more stable and accurate detection.

The first pressure sensor 610 and the second pressure sensor 620 may be electrically connected to the PCB 700 via wires to transmit signals to the PCB 700.

In an exemplary embodiment of the present invention the PCB 700 may include a controller having a processor.

The PCB 700 compares a sensor value received from the first pressure sensor 610 and a sensor value received from the second pressure sensor 620. When the two sensor values are identical to each other or a difference therebetween is within a normal range, the PCB 700 is configured to determine that the pedal function of the vehicle is normal. When the difference between the first and second sensor values is outside the predetermined range, the PCB 700 is configured to conclude that the pedal function of the vehicle is abnormal. Upon determining that the pedal function of the vehicle is normal, the PCB 700 generates a signal related to the pedal function of the vehicle. Upon determining that the pedal function of the vehicle is abnormal, the PCB 700 generates an error signal.

When an error signal is generated, a signal related to the pedal function is not generated, and a message related to the failure may be provided to the driver.

The pedal device according to an exemplary embodiment of the present disclosure may further include a cover 110 configured to cover the upper side of the pedal housing 100. A pedal stopper 810 may be coupled to the pedal pad 220. When the pedal stopper 810 comes into contact with the cover 110, the initial position of the pedal pad 220 and the return position of the pedal pad 220 by the spring force of the return spring 230 may be regulated.

The pedal stopper 810 made of rubber may be coupled to the pedal pad 220 at a position directly below the pad surface that the driver steps on.

For example, in the case of the accelerator pedal 201, the pedal stopper 810 may be coupled to the upper surface of the pedal pad 220 at a position directly above the hinge pin 210. In the case of the brake pedal 202, the pedal stopper 810 may be coupled to the upper surface of the pedal pad 220 at a position spaced forward from the hinge pin 210.

When the pedal pad 220 is mounted in the pedal housing 100 via the hinge pin 210 and the cover 110 is coupled to cover the upper side of the pedal housing 100, the pedal stopper 810 may be located below the cover 110.

Therefore, when the pedal stopper 810 coupled to the pedal pad 220 comes into contact with the lower surface of the cover 110, the initial position of the pedal pad 220 and the return position of the pedal pad 220 by the spring force of the return spring 230 may be regulated.

In the pedal 200 according to an exemplary embodiment of the present disclosure, when the driver operates the pedal pad 220, the upper end portion of the pedal pad 220 pivots downward about the hinge pin 210, and at the instant time, the return spring 230 is compressed. When the driver's operating force is removed from the pedal pad 220, the pedal pad 220 is pivoted in the opposite direction by the spring force of the return spring 230 and returns to the initial position thereof. The initial position and return position of the pedal pad 220 may be regulated by contact between the pedal stopper 810 and the cover 110 (refer to FIG. 3).

The pedal stopper 810 is formed of a cushioning material, such as rubber or silicon, to prevent noise and improve durability. However, the present disclosure is not limited thereto.

Furthermore, in the pedal 200 according to an exemplary embodiment of the present disclosure, when the pedal pad 220 is pivoted by the driver and comes into contact with the connection unit 300, the full-stroke position of the pedal pad 220 may be regulated.

When the driver operates the pedal pad 220, the upper end portion of the pedal pad 220 is pivoted downward about the hinge pin 210, and the pedal pad 220 is inserted into the pedal housing 100. When the lower end portion of the seating portion 221 provided at the pedal pad 220 comes into contact with the upper surface of the connection case 320 forming the connection unit 330, the full-stroke position of the pedal pad 220 may be regulated.

As is apparent from the above description, the electronic pedal device according to an exemplary embodiment of the present disclosure operates in a pressure operation manner, and thus enables a driver to operate a pedal with a small force. Furthermore, it is possible to greatly change operation force according to the operation stroke of a pedal pad using an elastic material which is formed to be gradually increased in a spring constant although the operational displacement of the pedal is very small, enabling the driver to easily recognize the operation amount of the pedal pad, and thus reducing driver fatigue.

Furthermore, the pedal device according to an exemplary embodiment of the present disclosure may detect operation of a pedal through a dual detecting structure using a first pressure sensor and a second pressure sensor, further ensuring safety when operating the pedal.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic pedal apparatus comprising:
   a pedal pivotably coupled to a pedal housing; and
   a connection unit connecting the pedal to the pedal housing and including an elastic material formed to be increased in a spring constant while being compressed in response that the pedal is pivoted to be inserted into the pedal housing,
   wherein the elastic material is formed in plural and the plurality of individual elastic materials has different cross-sectional thicknesses and different spring constants and is stacked in multiple layers,
   wherein the cross-sectional thicknesses of the plurality of individual elastic materials increase from an uppermost individual elastic material to a lowermost individual elastic material among the plurality of individual elastic materials, and
   wherein the spring constants of the plurality of individual elastic materials increase from the uppermost individual elastic material to the lowermost individual elastic material.

2. The electronic pedal apparatus of claim 1, wherein the pedal includes:
   a pedal pad pivotably coupled at a lower end portion thereof to the pedal housing; and
   a return spring configured to support the pedal pad and to apply return force to the pedal pad.

3. The electronic pedal apparatus of claim 2, wherein the connection unit further includes:
   a connection case mounted in the pedal housing to be regulated in position and accommodating the elastic material to guide linear movement of the elastic material;
   a fixing plate coupled to a lower end portion of the connection case to support a lower surface of the elastic material; and
   a push rod extending through the connection case and including a first end portion pivotably connected to the pedal pad and a second end portion supporting an upper surface of the elastic material in the connection case.

4. The electronic pedal apparatus of claim 3, wherein the push rod includes:
   a circular top protruding portion rotatably coupled in an arc recess formed in a seating portion of the pedal pad outside the connection case; and
   a planar bottom surface portion supporting the upper surface of the elastic material in the connection case.

5. The electronic pedal apparatus of claim 4, wherein the circular top protruding portion is formed to be smaller than the planar bottom surface portion while coaxially aligning a center of gravity of the circular top protruding portion and a center of gravity of the planar bottom surface portion with each other.

6. The electronic pedal apparatus of claim 4,
wherein the elastic material is formed in plural and the plurality of individual elastic materials has different spring constants and is stacked in multiple layers, and
wherein the planar bottom surface portion of the push rod is in surface-contact with an individual elastic material having a smallest spring constant.

7. The electronic pedal apparatus of claim 3,
wherein the push rod includes a plurality of fixing protrusions,
wherein the elastic material includes a plurality of protrusion grooves formed in the elastic material to allow the fixing protrusions to be fitted into the plurality of protrusion grooves, and
wherein, in response that the elastic material is compressed or restored, the fixing protrusions move along the protrusion grooves.

8. The electronic pedal apparatus of claim 3, further including:
a first material and a second material mounted in the pedal pad and the push rod, respectively, and positioned to face each other in an area in which the pedal pad and the push rod are connected to each other,
wherein the first material and the second material are configured to generate magnetic attraction therebetween to provide a feeling of operation of the pedal pad for a driver.

9. The electronic pedal apparatus of claim 8,
wherein the first material and the second material are implemented as magnets, or
wherein one of the first material and the second material is a magnet, and a remaining one thereof is a metal attracted to the magnet.

10. The electronic pedal apparatus of claim 2, further including:
a first pressure sensor fixedly mounted in the pedal housing to be connected to the connection unit and configured to detect pressure in response that the elastic material is compressed by pivotal movement of the pedal pad by a driver; and
a printed circuit board (PCB) mounted in the pedal housing and operatively connected to the first pressure sensor and configured to receive a signal from the first pressure sensor and to generate a signal related to a pedal function of a vehicle.

11. The electronic pedal apparatus of claim 10, further including:
a second pressure sensor fixedly mounted in the pedal housing to be connected to a lower end portion of the return spring and configured to detect pressure in response that the return spring is compressed by pivotal movement of the pedal pad by the driver,
wherein the PCB is operatively connected to the second pressure sensor and configured to receive a signal from the second pressure sensor and generate a signal related to the pedal function of the vehicle.

12. The electronic pedal apparatus of claim 10,
wherein the first pressure sensor is fixedly mounted in the pedal housing to be connected to the connection unit via a first damper, or
wherein the second pressure sensor is fixedly mounted in the pedal housing to be connected to the lower end portion of the return spring via a second damper.

13. The electronic pedal apparatus of claim 11, wherein the PCB is configured to compare a first sensor value received from the first pressure sensor and a second sensor value received from the second pressure sensor,
wherein, in response that the first and second sensor values are identical to each other or a difference between the first and second sensor values is within a predetermined range, the PCB is configured to conclude that the pedal function of the vehicle is normal,
wherein, in response that the difference between the first and second sensor values is outside the predetermined range, the PCB is configured to conclude that the pedal function of the vehicle is abnormal,
wherein, upon concluding that the pedal function of the vehicle is normal, the PCB is further configured to generate a signal related to the pedal function of the vehicle, and
wherein, upon concluding that the pedal function of the vehicle is abnormal, the PCB is further configured to generate an error signal.

14. The electronic pedal apparatus of claim 2,
wherein the connection unit connects the pedal pad to the pedal housing, and
wherein the connection unit including the elastic material is disposed farther away from a hinge pin connecting the lower end portion of the pedal pad to the pedal housing than the return spring.

15. The electronic pedal apparatus of claim 1,
wherein the elastic material is formed in plural and the plurality of individual elastic materials has different spring constants and is stacked in multiple layers, and
wherein the plurality of individual elastic materials is formed of memory foam or rubber.

16. The electronic pedal apparatus of claim 15, wherein the plurality of individual elastic materials stacked in the multiple layers include an integrated structure in which adjacent elastic materials thereof are coupled to each other.

17. The electronic pedal apparatus of claim 2, further including:
a cover covering an upper side of the pedal housing,
wherein a pedal stopper is mounted to the pedal pad, and
wherein, in response that the pedal stopper comes into contact with the cover, an initial position of the pedal pad and a return position of the pedal pad by a spring force of the return spring are regulated.

18. The electronic pedal apparatus of claim 1, wherein, in response that the pedal pad is operated and comes into contact with the connection unit, a full-stroke position of the pedal pad is regulated.

19. An electronic pedal apparatus comprising:
a pedal pivotably coupled to a pedal housing; and
a connection unit connecting the pedal to the pedal housing and including an elastic material formed to be increased in a spring constant while being compressed in response that the pedal is pivoted to be inserted into the pedal housing,
wherein the pedal includes a pedal pad pivotably coupled at a lower end portion thereof to the pedal housing,
wherein the connection unit further includes:
a connection case mounted in the pedal housing to be regulated in position and accommodating the elastic material to guide linear movement of the elastic material; and
a push rod extending through the connection case and including a first end portion pivotably connected to the pedal pad and a second end portion supporting an upper surface of the elastic material in the connection case, and
wherein the push rod includes:

a circular top protruding portion rotatably coupled in an arc recess formed in a seating portion of the pedal pad outside the connection case; and a planar bottom surface portion supporting the upper surface of the elastic material in the connection case.

20. An electronic pedal apparatus comprising:

a pedal pivotably coupled to a pedal housing, the pedal including a pedal pad pivotably coupled at a lower end portion thereof to the pedal housing and a return spring configured to support the pedal pad and to apply return force to the pedal pad; and a connection unit connecting the pedal to the pedal housing and including an elastic material formed to be increased in a spring constant while being compressed in response that the pedal is pivoted to be inserted into the pedal housing, a first pressure sensor fixedly mounted in the pedal housing to be connected to the connection unit and configured to detect pressure in response that the elastic material is compressed by pivotal movement of the pedal pad by a driver;

a printed circuit board (PCB) mounted in the pedal housing and operatively connected to the first pressure sensor and configured to receive a signal from the first pressure sensor and to generate a signal related to a pedal function of a vehicle; and a second pressure sensor fixedly mounted in the pedal housing to be connected to a lower end portion of the return spring and configured to detect pressure in response that the return spring is compressed by pivotal movement of the pedal pad by the driver, wherein the PCB is operatively connected to the second pressure sensor and configured to receive a signal from the second pressure sensor and generate a signal related to the pedal function of the vehicle, wherein the PCB is configured to compare a first sensor value received from the first pressure sensor and a second sensor value received from the second pressure sensor, wherein, in response that the first and second sensor values are identical to each other or a difference between the first and second sensor values is within a predetermined range, the PCB is configured to conclude that the pedal function of the vehicle is normal, wherein, in response that the difference between the first and second sensor values is outside the predetermined range, the PCB is configured to conclude that the pedal function of the vehicle is abnormal, wherein, upon concluding that the pedal function of the vehicle is normal, the PCB is further configured to generate a signal related to the pedal function of the vehicle, and wherein, upon concluding that the pedal function of the vehicle is abnormal, the PCB is further configured to generate an error signal.

* * * * *